US006868226B1

(12) United States Patent
Kwoh et al.

(10) Patent No.: US 6,868,226 B1
(45) Date of Patent: Mar. 15, 2005

(54) APPARATUS AND METHODS FOR VOICE TITLES

(75) Inventors: Daniel S. Kwoh, La Canada/Flintridge, CA (US); Henry C. Yuen, Redondo Beach, CA (US)

(73) Assignee: Index Systems, Inc., Tortol (VG)

( * ) Notice: Subject to any disclaimer, the term of this patent is extended or adjusted under 35 U.S.C. 154(b) by 0 days.

(21) Appl. No.: 09/223,431

(22) Filed: Dec. 30, 1998

Related U.S. Application Data

(63) Continuation-in-part of application No. 08/894,145, filed on Aug. 12, 1997, now abandoned.
(60) Provisional application No. 60/070,056, filed on Dec. 30, 1997.

(51) Int. Cl.[7] .................................................. H04N 5/91
(52) U.S. Cl. ........................................... 386/95; 386/96
(58) Field of Search ............................... 386/1, 39, 46, 386/83, 95–96; 348/731, 734; 455/179.1, 181.1, 185.1, 186.1

(56) References Cited

U.S. PATENT DOCUMENTS

| | | | |
|---|---|---|---|
| 4,224,644 A | | 9/1980 | Lewis et al. ................ 360/72.2 |
| 4,577,239 A | | 3/1986 | Sougen ......................... 360/15 |
| 4,703,465 A | | 10/1987 | Parker .......................... 369/30 |
| 5,047,867 A | | 9/1991 | Strubbe et al. .............. 358/335 |
| 5,097,363 A | | 3/1992 | Takei et al. |
| 5,124,814 A | * | 6/1992 | Takahashi et al. .......... 386/107 |
| 5,155,636 A | | 10/1992 | Odaka .......................... 360/32 |
| 5,206,937 A | | 4/1993 | Goto ............................. 395/325 |
| 5,245,600 A | | 9/1993 | Yamauchi et al. ............ 369/49 |
| 5,250,745 A | | 10/1993 | Tsumura ........................ 84/603 |
| 5,390,027 A | * | 2/1995 | Henmi et al. .................. 386/65 |
| 5,444,768 A | * | 8/1995 | Lemaire et al. ............... 379/68 |
| 5,488,409 A | * | 1/1996 | Yuen et al. ...................... 348/5 |
| 5,515,101 A | | 5/1996 | Yoshida |
| 5,583,562 A | * | 12/1996 | Birch et al. .................... 348/12 |
| 5,600,756 A | * | 2/1997 | Ely ............................... 704/235 |
| 5,659,367 A | * | 8/1997 | Yuen ............................ 348/465 |
| 5,761,371 A | * | 6/1998 | Ohno et al. .................... 386/46 |

(List continued on next page.)

FOREIGN PATENT DOCUMENTS

| | | |
|---|---|---|
| EP | 393955 A | 10/1990 |
| WO | WO 89/10615 | 11/1989 |
| WO | WO 94/16441 | 7/1994 |

OTHER PUBLICATIONS

Copy of International Search Report of corresponding application PCT/US96/05767.

*Primary Examiner*—Huy Nguyen
(74) *Attorney, Agent, or Firm*—Fish & Neave IP Group of Ropes & Gray LLP

(57) ABSTRACT

An apparatus for providing voice titles for recorded programs includes a recorder (11,19) for recording on a sequential recording medium, which has an audio recording portion (242) and a control recording portion (246). A control input (222) is provided for indicating a start of a voice title and the start indicator (252) is recorded on the control recording portion of the sequential medium. A microphone (264) or other device is provided for entering a voice title and for recording the entered voice title onto the audio recording portion of the sequential medium sequentially following the recorded indication of the start of the voice title in the control recording portion. A control input (222) is provided for indicating an end of the voice title and the end indicator (254) is recorded onto the control recording portion of the sequential medium sequentially following the recorded voice title in the audio recording portion. The apparatus includes an analog to digital converter (270) for digitizing the entered voice title and a memory (33) for storing the digitized voice title. Another embodiment of the apparatus includes a voice synthesizer (260) for synthesizing a voice from the stored digitized voice title.

63 Claims, 16 Drawing Sheets

U.S. PATENT DOCUMENTS

| | | | | | |
|---|---|---|---|---|---|
| 5,774,857 | A | * | 6/1998 | Newlin | 704/271 |
| 5,822,492 | A | | 10/1998 | Wakui et al. | |
| 5,826,008 | A | * | 10/1998 | Bluvband | 714/57 |
| 5,903,309 | A | * | 5/1999 | Anderson | 348/333 |
| 5,938,727 | A | * | 8/1999 | Ikeda | 709/218 |
| 5,956,458 | A | * | 9/1999 | Sezan et al. | 386/95 |
| 6,058,239 | A | * | 5/2000 | Doyle | 386/46 |
| 6,091,884 | A | * | 7/2000 | Yuen et al. | 386/83 |
| 6,118,925 | A | * | 9/2000 | Murata et al. | 386/83 |
| 6,147,715 | A | * | 11/2000 | Yuen et al. | 348/565 |
| 6,334,025 | B1 | * | 12/2001 | Yamagami | 386/96 |
| 6,341,195 | B1 | * | 1/2002 | Mankovitz et al. | 386/83 |
| 6,389,561 | B1 | * | 5/2002 | Bluvband | 714/57 |

* cited by examiner

APPARATUS AND METHODS FOR VOICE TITLES

CROSS-REFERENCE TO RELATED APPLICATIONS

This application is a continuation-in-part of application Ser. No. 08/894,145, filed on Aug. 12, 1997, now abandoned, and U.S. Provisional patent application No. 60/070,056, filed on Dec. 30, 1997, disclosures of which are incorporated herein by reference.

FIELD OF THE INVENTION

This invention relates generally to video cassette recorder systems and camcorders and methods and apparatus for recording and reproducing titles for programs recorded thereon.

DESCRIPTION OF THE RELATED ART

Video cassette recorders and camcorders use video tape, which by its nature is a sequential medium that is recorded and accessed sequentially. Mass storage devices that can only be accessed sequentially, include: analog audio tapes used for audio cassette drives; video tapes used with video cassette recorders (VCRs); digital audio tapes; digital tape drives and tape backup cassette drives for use with computers; and analog tape drives for instrumentation purposes. All of these devices use magnetic tape as the storage media. The big advantage of sequential medium, such as tape, is low cost compared with random access devices, such as semi-conductor random access memory.

It is desirable to know the contents and location of programs on a tape. A directory recorded on the tape or stored in an apparatus can be used to access a particular program on the tape, as disclosed in continuation-in-part application Serial No. 08/176,852.

Owners of tapes desire to title programs on the tapes to enable rapid identification and access of the program thereon. One method is to title a tape and programs-on the tape by hand by writing titles on a label fastened to the tape cartridge or its box. However, the tape can become separated from the box, br the label may fall off. Some tape owners repeatedly record over the same tape and prefer not to use permanent labels. Computer tapes may contain hundreds of records or files and handwriting or updating the index onto the box is not practical.

Placing a descriptive title on the tape itself presents other problems. Video titling for a program such as a movie is well known, but these titles are part of the movie and a typical home user cannot modify or edit these titles and the user must play the movie to access the title. Professional video titling systems include the well-known Chyron system. Typically these systems include a complete computer, a complex, high-resolution character generator, a special effects generator for making shadows, italics and other effects, and a video interface to generate a video signal. Such systems are too expensive and complicated for the home video market.

Some videocassette recorders (VCRs) and camcorders are equipped with simple character generators for displaying simple block letters and numbers, either superimposed over a recorded video signal or recorded and mixed with the picture signal. A typical camcorder application is to add characters representing the recording date and time to a video signal as it is being recorded, thereby adding a "date stamp." In VCRs, the character generator can be used to show programming information such as channel, date, and time on screen as the VCR is being programmed to record programs at a future date. However, currently there is no simple way to add titles to tapes or programs recorded on the VCR.

Another problem with prior art titling systems is data input and editing. With Chyron systems, a full-size typewriter-style keyboard is used which is inappropriate for home use and slow for poor typists. Editing of a title is impractical with most home-generated titles, because the title is recorded as a video image on the tape. Also, there are many situations, where adding a title by entering characters is not at all convenient.

SUMMARY OF THE INVENTION

In accordance with the present invention, an audio signal is generated of a title for a video program recorded on a magnetic medium, e.g. video tape. The audio signal is recorded on the video tape as a voice title. Thereafter, the voice title is used as part of an on-screen directory to gain access to video programs stored on the video tape for playback.

In one embodiment, the voice titles are audibly reproduced from the video tape on command when the directory for a video tape is displayed. If desired, the directory could display a message that a voice title of a video program is available along with the titles in textual form of other video programs recorded on the video tape.

In another embodiment, the voice titles are integrated with video segments recorded on a camcorder. The voice titles are digitized by an analog to digital converter and encoded by a vertical blanking interval encoder for recording in the vertical blanking interval lines of the video segment. It is another object of the invention that a date and time read from a clock in a camcorder can be recorded in the vertical blanking interval of a video segment.

In another embodiment, the voice titles are stored on the video tape and audibly reproduced therefrom on command when the directory for a video tape is retrieved from the video tape or RAM and displayed. If the directory is retrieved from RAM, it could display a message that a voice title of a video program is available along with the titles in textual form of other video programs recorded on the video tape.

In another embodiment, the voice titles are stored in the RAM where the directory is stored and readout with the titles and index information of the other video programs. The voice titles could either be converted to digitized audio signals or converted to alphanumeric textual signals before storage in the RAM.

In another embodiment, video programs are recorded on a video tape and audio signals of titles for the recorded programs are generated. The audio signals are recorded as voice titles and the voice titles are converted to textual titles. A directory of the video programs recorded on the tape including the textual titles are displayed on a screen. A video program from the directory is selected and the audio signal corresponding to the selected video program is reproduced to appraise a user of the voice title of the selected video program.

In accordance with the present invention an apparatus for providing voice titles for video segments on a sequential medium includes means for recording an index mark at the start of a video segment onto the sequential medium for marking the start of the video segment, means for indicating the start of a voice title, means for recording a voice title onto the sequential medium in the vertical blanking interval of the video segment and means for indicating an end of the voice title. The apparatus further includes means for recording a voice title present indicator into the sequential medium in the vertical blanking interval of the video segment. A time-of-recording, which can include a date of recording, is also recorded onto the sequential medium in the vertical blanking interval of the video segment.

DETAILED DESCRIPTION OF THE SPECIFIC EMBODIMENTS

Figure 1:
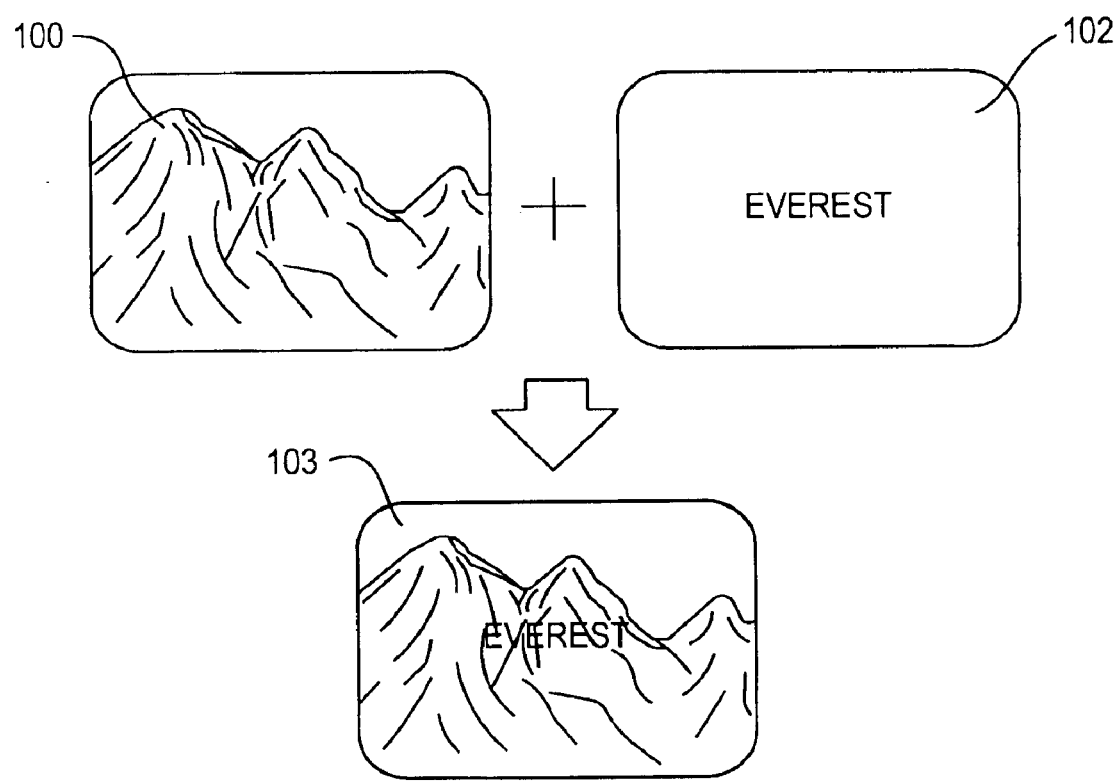
FIG. 1 is an illustration of a prior art method of adding a title to a program recorded on a camcorder.

Referring now to the drawings, and more particularly, to FIG. 1, there is shown an illustration of a prior art method of adding a title to a program recorded on a camcorder. For example, the SONY Handycam CCD-F330 is a camcorder that allows a user to superimpose a time and date and also a title onto a program being recorded. To record a date or time the user pushes a DATE SET or TIME SET button and the time or date are recorded along with the program. Later when the recording is played, the date or time is visible on a monitor.

To record a title the user first stores a title into the camcorder. This is done by drawing the title on a title card and then focusing the camera on the title card and pressing a MEM TITLE button. Then while recording a program, the stored title can be superimposed on the program by pressing a TITLE button. As shown in FIG. 1, the memorized title 102 is superimposed on the program being recorded, represented by frame 100, to form a composite recording 103. This method of titling has limited utility and requires that a title card be made so that the title can be memorized.

Figure 2:
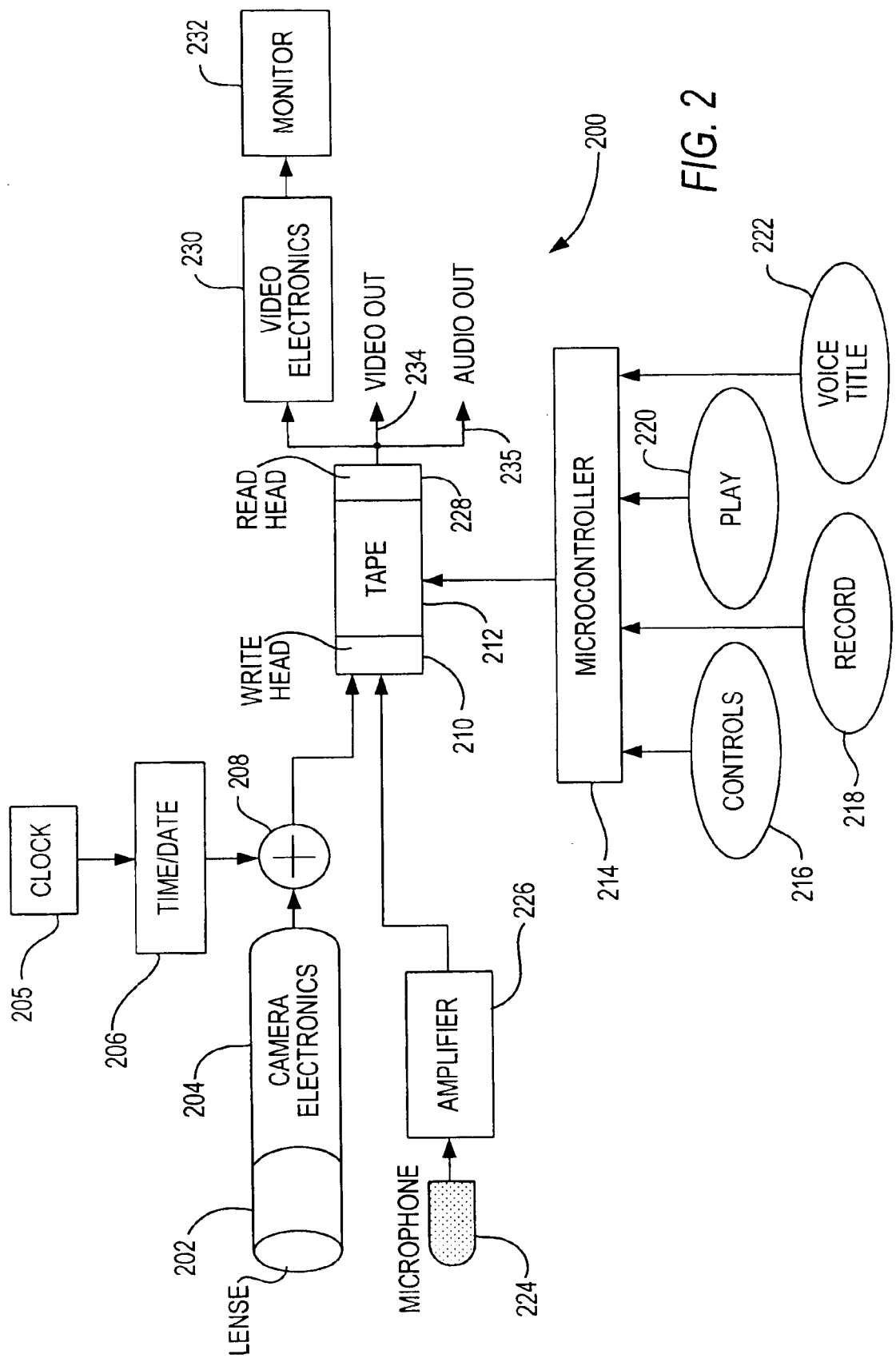
FIG. 2 is a block diagram of a camcorder including the capability for voice titles according to the present invention.

FIG. 2 is a block diagram of a camcorder 200 including the capability for voice titles according to the present invention.

The camcorder 200 has the conventional elements of a camcorder including: a lens 202 and camera electronics 204; a microphone 224 and amplifier 226; a write head 210 which can write on a tape 212 and a read head 228 that can read the tape 212; video electronics 230; and monitor 232. In many camcorders it is possible to record the time or the date on the video track. Clock 205 provides the time or date 206 which can be superimposed onto the video via adder 208. Many conventional camcorders include a video out 234 and audio out 235 which can be used to output the video and audio to a video cassette recorder or to a television monitor. Camcorder 200 is controlled by microcontroller 214. Control buttons 216 including record button 218 and play button 220 are inputs to microcontroller 214. Voice title button 222 is provided to allow a user to indicate that the following audio is a voice title. In one embodiment the user presses voice title button 222 once and then records a title by speaking into the microphone 224, and then pushes the voice title button 222 again to indicate the end of the voice title. The voice title is recorded onto the audio track of tape 212.

Figure 3:
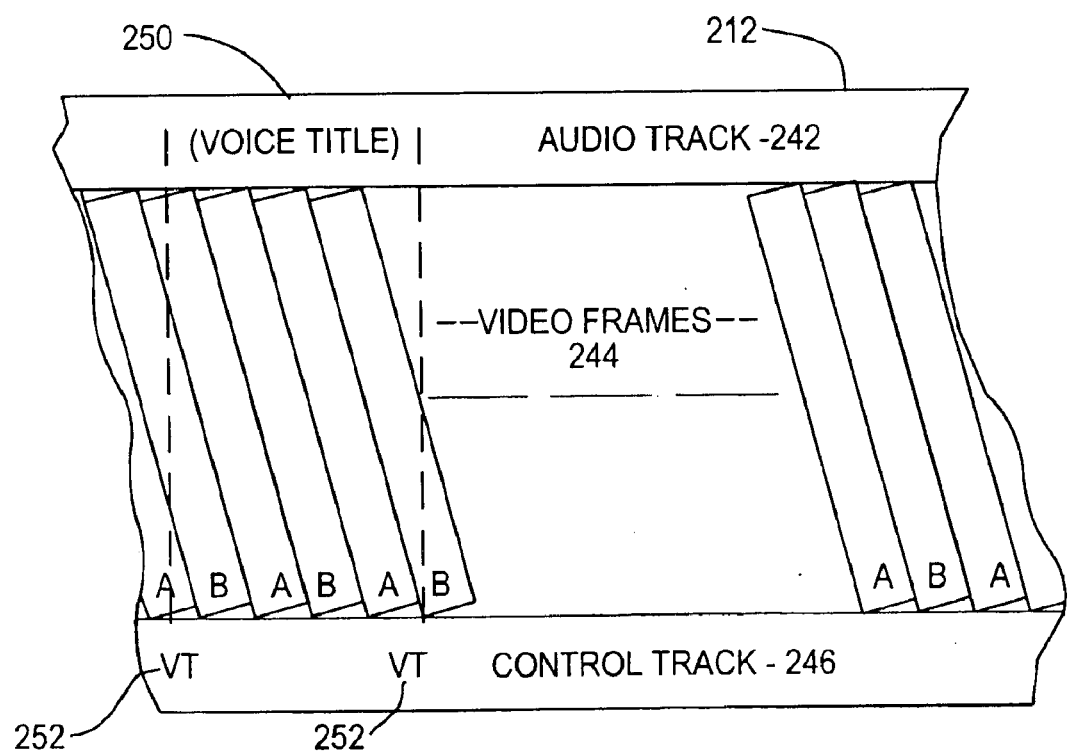
FIG. 3 is a graphical representation of the format of the information recorded on the magnetic tape in the camcorder of FIG. 2 with the voice title in the audio track and markers in the control track according to the present invention.

FIG. 3 is a graphical representation of the format of the information recorded on a tape, such as tape 212 in the camcorder 200 of FIG. 2, showing a voice title 250 recorded in an audio track 242 and voice title markers 252 and 254 recorded in the control track 246 according to the present invention. (Instead of recording voice title 250 in audio track 242, it could be recorded in the vertical blanking interval of the video signal before, during, or after recording. The tape 212 can be 8 mm tape used in some camcorders, a BETA format tape, or a VHS format tape, all of which use the same general tape layout. The tape 212 is divided into three areas. A narrow strip running along the upper edge of the tape 212 is an audio track 242 which contains audio signals. A second narrow strip running along the bottom edge of the tape is a control track 246 which contains control signals. The middle area 244 is for video signals which are recorded in pairs of parallel fields going up and down the width of the tape at a slight angle.

Various signals can be recorded in the control track including VISS marks, which are described below in relation to FIG. 10, and voice title (VT) marks 252 and 254, as shown in FIG. 3. The VT mark 252 and VT mark 254 indicate the beginning and the end, respectively, of voice title 250, which is recorded in the audio track 242. The first time the user presses the voice title button 222, the VT mark 252 is recorded, and the second time the user presses the voice title button 222, the VT mark 254 is recorded.

Figure 4:
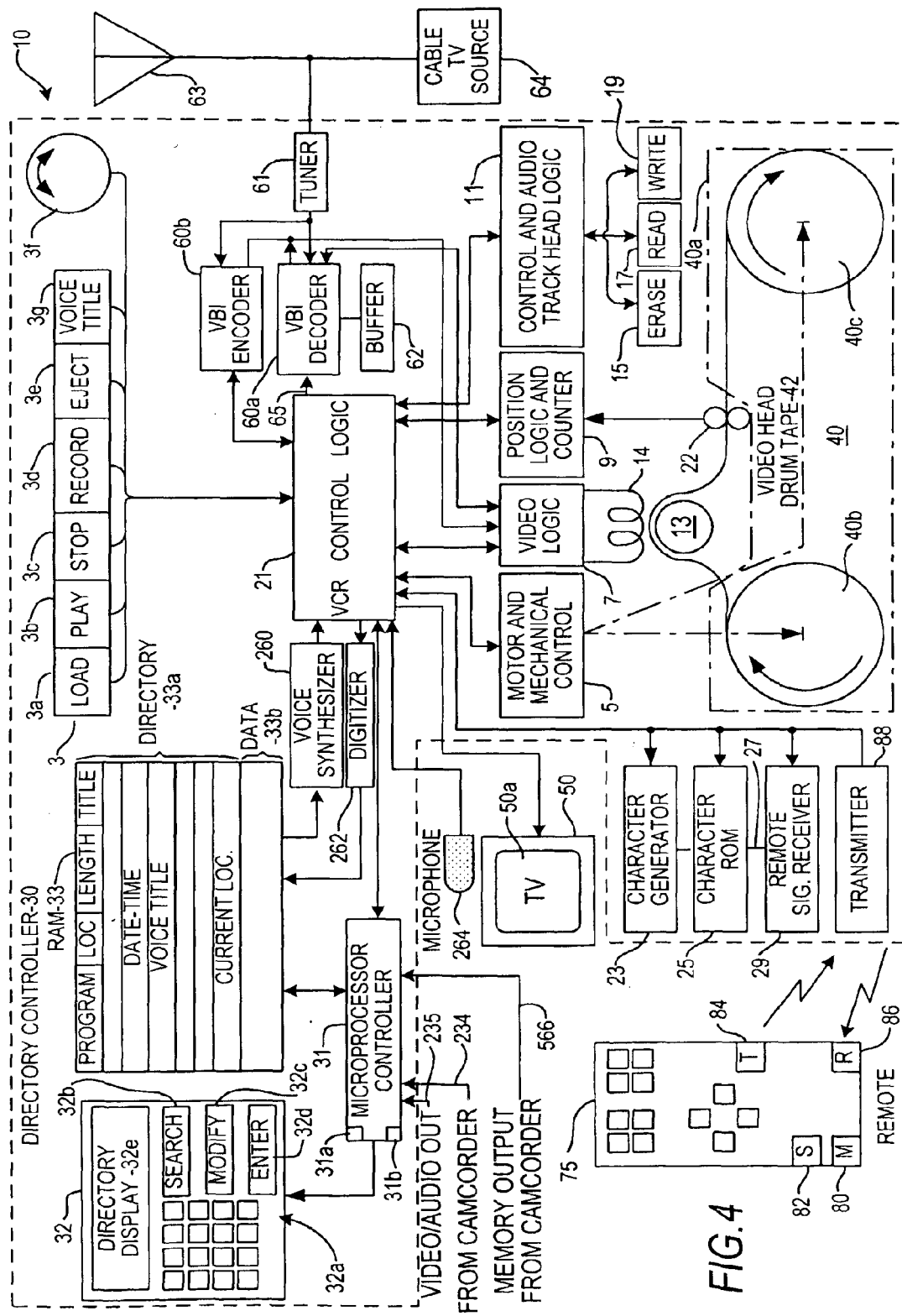
FIG. 4 is a block diagram illustrating an indexing video cassette recorder that provides indexing of recorded programs using a directory and that has the capability for voice titles for programs according to the present invention.

FIG. 4 is a block diagram illustrating an indexing video cassette recorder 10 that provides indexing of recorded programs using a directory and that has a voice title capability according to the present invention. The indexing VCR 10 includes a video cassette reader/recorder (VCR) function with a directory controller function 30. External to the indexing VCR 10 is a television monitor 50 and a remote controller 75. The VCR function is a video tape reader/recorder means and uses any one of many different recording technologies such as BETA, VHS, super VHS, 8 mm, VHS-C or any other popular technologies. In particular, VHS-C indexed tapes can be played directly on a VHS indexing VCR with full index functioning. The cassette 40 is a conventional video cassette having a magnetic tape 42 packaged in a cartridge 40a or cassette housing (hereafter called cassette) and transported between a feeding spindle 40b and a takeup spindle 40c. Even though the size and design of the housing is different for different types of recording technology, the basic information that goes on the tape itself is similar. The technology and operation of a VCR are well understood in the art.

The indexing VCR 10 has a button control panel 3 with control buttons, including LOAD 3a, PLAY 3b, STOP 3c, RECORD 3d, EJECT 3e, and VOICE TITLE 3f for controlling the operation of the VCR. The LOAD button 3a is optional and is not used on machines which load automatically. The VCR control logic circuit 21 receives control signals from the button control panel 3 and controls the overall operation of the VCR by sending control signals to a motor and mechanical control logic circuit 5, a video logic circuit 7, a position logic and counter circuit 9, and a control and audio track head logic circuit 11, as well as to the microprocessor controller 31 of the directory controller 30.

The motor and mechanical control logic circuit 5 controls loading and ejecting of the cassette 40 and also controls movement of the video tape 42 within the video cassette 40 during recording, reading (playback), fast forward, and rewind. The video logic circuit 7 controls the operation of a video read/write head drum 13 in reading from or recording video signals to the tape 42. The electrical signals are magnetically coupled between the video logic circuit 7 and the video head drum 13 using a winding 14. The position logic and counter circuit 9 monitors tape movement through a cassette tape movement sensor 22 and generates signals that represent tape position. The control and audio track head logic circuit 11 controls writing, reading, and erasing of signals on the control or audio track of the tape 42 through the write head 19, the read head 17, and the erase head 15.

The directory controller 30 includes a microprocessor controller 31, a random access memory (RAM) 33 and a directory input/output display and control panel 32. Preferably the microprocessor controller 31 comprises an integrated circuit microprocessor, a program store 31a, such as a read-only-memory (ROM), for storing a control program to implement methods of the invention, and a clock 31b for generating a clock signal for timing functions and providing the time. The time may be set using the directory input/output display and control panel 32 in a manner known in the art. The microprocessor controller 31 controls the operation of the directory controller 30 and interfaces with the VCR control logic circuit 21 to implement the necessary functional capabilities for reading, updating and writing the directory. The microcontroller processor 31 in the indexing VCR 10 performs all indexing functions and human interface, interprets (e.g. tab, indent, screen format, attributes) and processes the auxiliary information display.

The RAM 33 is a conventional random access semiconductor memory which interfaces directly with the microprocessor controller 31. The RAM 33 is preferably non-volatile. Alternatively, the RAM 33 has a battery backup. The battery backup should maintain the contents of the memory for a predetermined time, e.g., 7 days, after the loss of power. The retention time may be shorter, if the indexing VCR uses an automatic backup of the memory onto video tape. A portion of the RAM 33, shown as system data 33b, is used for storing the system software of the microprocessor controller 31. The RAM 33 is also used for storing the program directory 33a. Portions of the RAM 33 are used as memory for digitized voice titles. The size of the RAM 33 is at the discretion of the manufacturer. However, the RAM 33 preferably can store the directory of at least 400 tapes. Accordingly, the RAM 33 has preferably at least 256 kilobits of memory for library storage. Effective memory size of the RAM 33 may be increased by using well known data compression techniques. Data recorded in the RAM 33 may be encoded or scrambled.

The directory input/output display and control panel 32 has an alphanumeric keyboard 32a and special function keys, such as a SEARCH key 32b for commanding searches for data in the directory 33a and on the tape 42, a MODIFY key 32c for modifying or deleting directory information in the RAM 33, and an ENTER key 32d for entering program directory information. Instead of providing special function keys, functions can also be initiated by entering predefined sequences of conventional keys on the alphanumeric keyboard 32a.

A display 32e is a conventional liquid crystal or other type display for displaying data being entered on the keyboard 32a, and to display the directory or other information stored in the RAM 33. Alternately, data can be shown on-screen a television display 50a. The directory information stored in the RAM 33 is processed by the microprocessor controller 31.

The VCR 10 additionally comprises a character generator circuit 23 coupled to the VCR control logic circuit 21 and to a character generator read-only memory (ROM) 25. Character generators are well-known in the art. Typically, the character generator ROM 25 stores a data table representing pixel or bit patterns of a plurality of alphanumeric characters, such as the Roman alphabet and the Arabic numerals. Upon command by the VCR control logic circuit 21 and the character generator circuit 23, the data in the character generator ROM 25 is read and placed in an output signal to a video display, such as television 50, at a position on the display determined by coordinates generated by the microprocessor controller 31, or the characters could be sent to display 32e. The end result is visual display of a alphanumeric character on the display screen.

As shown in FIG. 4, vertical blanking interval (VBI) signal decoder 60a is coupled to the output of a tuner 61, which is generally included in the majority of consumer VCRs for off-the-air recording. The vertical blanking interval is the time that the beam on a television is retracing from the bottom to the top of the screen. During this interval video is not written to the screen, thus, information can be sent during the vertical blanking interval. The tuner 61, which receives a broadcast TV signal from an antenna 63, a cable TV signal source 64, or a satellite receiver system, provides the signals to a VBI decoder 60a which decodes data recorded on the VBI of the received video signal. In some applications, a VBI encoder 60b encodes data onto the VBI of the video signal that is to be recorded onto the video tape 42. Directory data can be encoded in the VBI and retrieved by the VBI decoder 60a and provided to the directory controller for storage in RAM 33. For example, the directory data can include the program name and the program type. Note that directory data can also be entered into RAM 33 by using keypad 32a.

A decoder signal line 65 is coupled from the decoder to the VCR control logic circuit 21 to carry decoded VBI data to the control logic circuit. The VCR control logic circuit 21 is commanded by the microprocessor controller 31 to pass the decoded data to the directory 33a under control of a stored program in the RAM 33. The stored program then causes the VBI information to be stored as in the directory. The directory data can be displayed on the television 50 or the display 32e.

The indexing video cassette recorder 10 shown in FIG. 4 also has a voice title capability. The voice title capability is provided by microphone 264 which is coupled to VCR control logic 21, digitizer 262 which is coupled between VCR control logic 21 and RAM 33, and voice synthesizer 260 which is coupled between RAM 33 and VCR control logic 21. The user of indexing VCR 10 can record a voice title on the tape, 42 by pressing voice title button 3g and speaking a title into microphone 264. The end of the voice title is indicated by again pressing voice title button 3g. The voice title is recorded on tape 42 in the audio track and the voice title markers are recorded in the control track of tape 42 in the same manner as shown in FIG. 3. In an alternate embodiment, a button is provided on remote controller 75 for indicating a voice title. The button on the remote controller would operate in the same manner as voice title button 3g. As shown in FIG. 4, inputs are provided to microprocessor controller 31 for inputting the camcorder video out 234 and the camcorder audio out 235.

Figure 5:
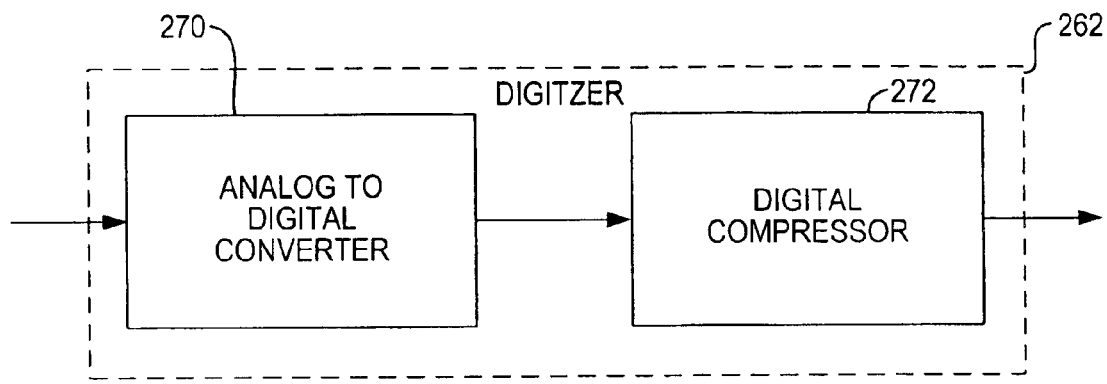
FIG. 5 is a block diagram of the digitizer shown in FIG. 4.

Voice titles entered via microphone 264 are digitized by digitizer 262 and stored in RAM 33. FIG. 5 is a block diagram of the digitizer 262 shown in FIG. 4. The digitizer may be as simple as an analog to digital converter 270, or may include additional digital signal processing functions such as filtering. The digital output of the analog to digital converter 270 can be compressed by digital compressor 272 before being sent to RAM 33 in order to save memory.

Figure 6:
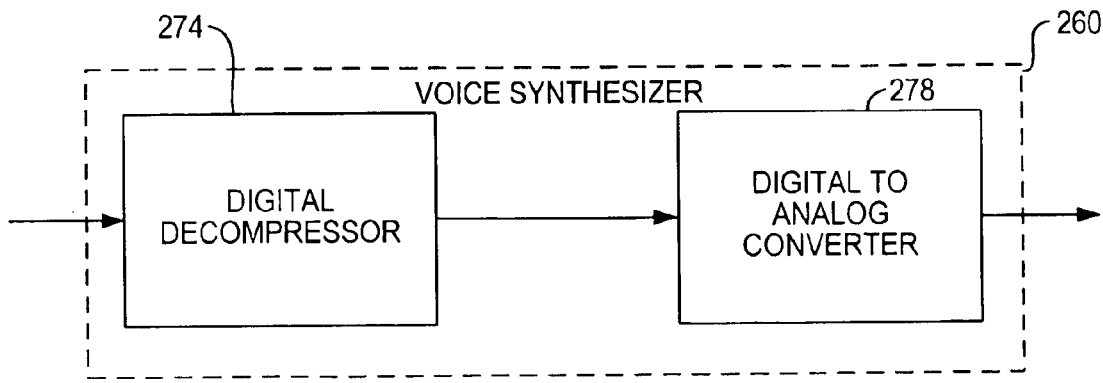
FIG. 6 is a block diagram of the voice synthesizer shown in FIG. 4.

Upon command the voice titles can be read from RAM 33 and a voice output synthesized in voice synthesizer 260 and output to a speaker in television 50. Alternatively, a speaker (not shown) can be provided internal to the VCR 10. FIG. 6 is a block diagram of the voice synthesizer 262 shown in FIG. 4. The voice synthesizer includes a digital to analog converter 278 and can include a digital decompressor 274 for decompressing a compressed voice title. The digital compressor 272 and the digital decompressor 274 may include various digital signal processing functions, such as filtering, which are well known in the art.

In another embodiment of the indexing VCR 10 shown in FIG. 4, the remote controller 75 not only has a transmitter 84 for transmitting commands to the indexing VCR that are received by remote signal receiver 29, but can also receive signals transmitted by transmitter 88 in indexing VCR 88 via receiver 86 in remote controller 75. In a particular embodiment the remote controller has a microphone 80 which can be used by the user to enter a voice title. Keys on the remote controller are used to mark the beginning and the end of the voice title. The remote controller transmits the audio via transmitter 84 to receiver 29 in the indexing VCR 10. In another embodiment, a voice title that is synthesized from the voice title stored in RAM 33 is sent to transmitter 88 and transmitted in a wireless manner to receiver 86 in remote controller 75 and then sent to speaker 82. By including a microphone 80 and a speaker 82 in the remote controller 75 that has bi-directional wireless communication to the indexing VCR 10, the user has the capability of remotely entering and reviewing voice titles. This can be very useful if the user is across the room from the VCR when the user desires to enter a voice title.

Figure 7:
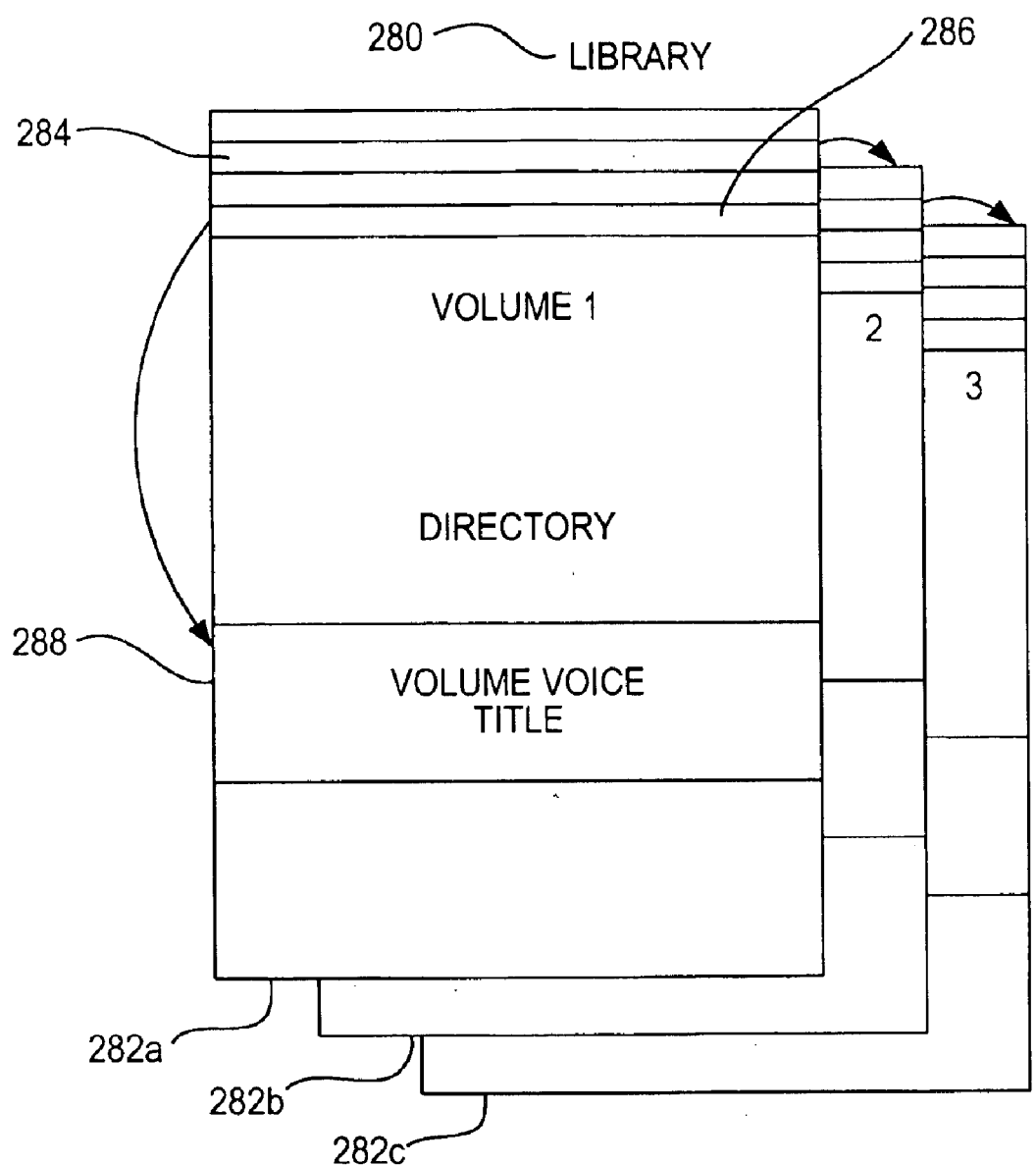
FIG. 7 is a schematic conceptually illustrating volume data including a volume voice title stored in the RAM of the directory controller of FIG. 4 according to the present invention.
Figure 8:
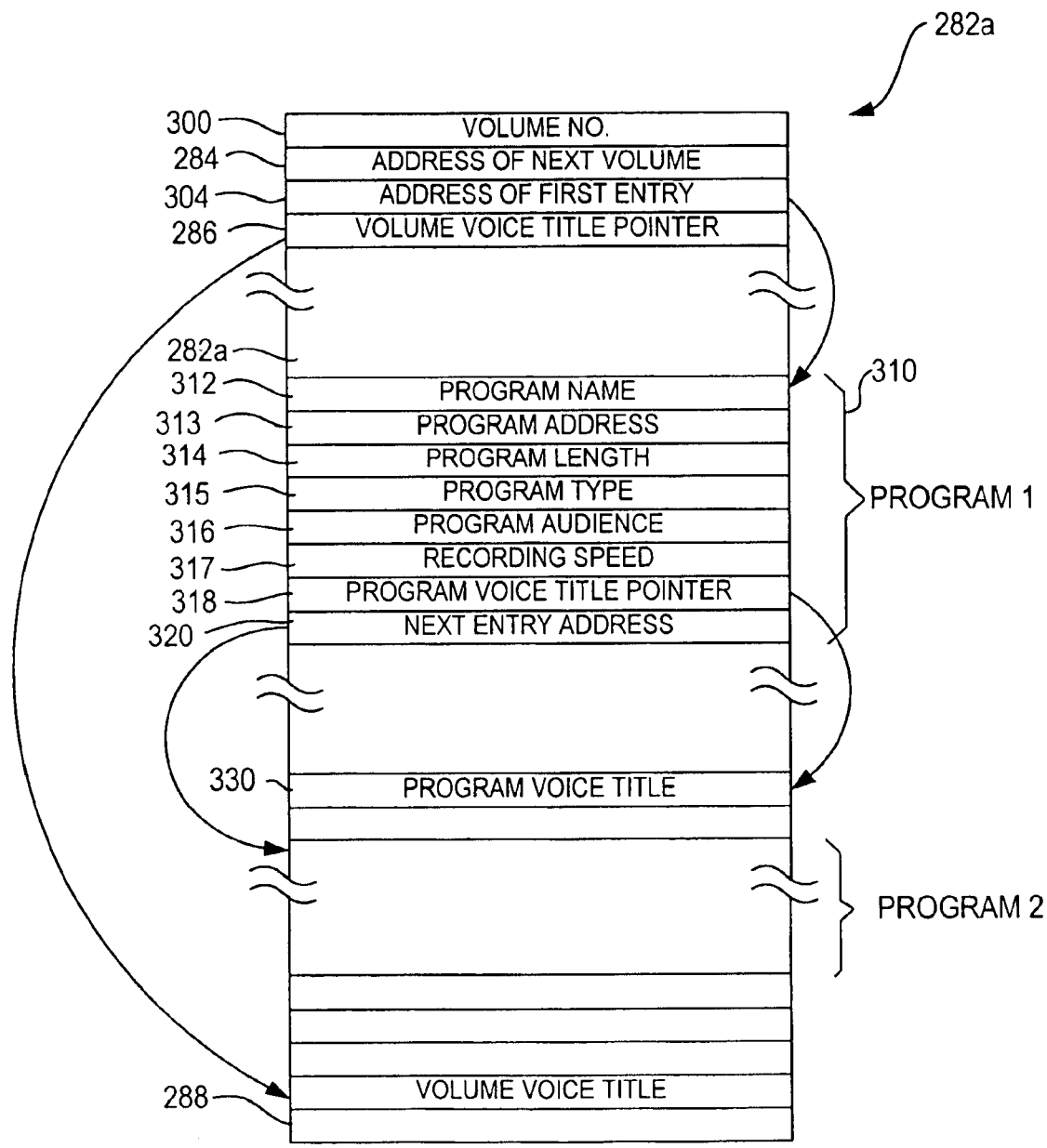
FIG. 8 is a schematic conceptually illustrating a structure of directory data for programs including program voice titles stored in the RAM of the directory controller of FIG. 4 according to the present invention.

The format of the directory and the voice title storage in RAM 33 is now described by referring to FIGS. 7 and 8. FIG. 7 is a schematic conceptually illustrating volume data including a volume voice title 288 stored in the RAM 33 of the directory controller 30 of FIG. 4 according to the present invention. FIG. 8 is a schematic conceptually illustrating a structure of directory data for programs including program voice titles stored in the RAM 33 of the directory controller 30 of FIG. 4 according to the present invention.

A library 280, as shown in FIG. 7, is stored in the RAM 33 and the library 280 stores directories of tapes, which users of the VCR 10 have archived. Each volume 282a, 282b, 282c corresponds to a tape and within each volume is a directory to the programs on the tape. The first volume 282a has a pointer 284 to the second volume 282b and so on. The first volume also has a volume voice title pointer 286 that points to the volume voice title 288. When the user is scanning through the library, the voice title of each volume can be accessed and sent to voice synthesizer 260 and then to the TV 50 speaker via VCR control logic 21.

FIG. 8 is a detailed view of the contents of volume 282a. The first entry 300 is a volume number, which is followed by the address of the next volume 284. This is followed by the address 304 of the first program entry in the volume. The volume voice title pointer 286, as explained above, points to the volume voice title 288. For each program recorded on the cassette tape, there is a corresponding directory entry 310. For purposes of illustration, FIG. 8 shows the entry 310 for only program 1. Each entry 310 stores: a title or program name 312; a program address 313, which contains an address on the tape for the beginning of the program; a program length value 314, which stores the length of the recorded program; an optional program type field 315, which stores the category of the recorded program; an optional program audience field 316, which stores the recommended audience of the program; an optional recording speed 317, which stores the speed at which the program is recorded; a program voice title pointer 318, which points to the location of the program voice title 330; and a next program entry address 320, which points to the next program entry.

A current tape location (not shown) is also stored in the directory for indicating the position from the beginning of the tape 42 in the cassette 40 when the tape is ejected. This field is used for setting a tape counter when the tape is reloaded into VCR 10.

Each item in the directory can be modified through the use of the buttons on the keyboard 32a and the special function keys 32b, 32c, 32d of the directory controller 32, and as indicated above, the directory may be written from data decoded from the VBI.

The volume voice titles stored in the directory can be used by the user to determine the tapes stored in the directory and to select a tape to play. Then the user can use the program voice titles to select a program to play.

Figure 9:
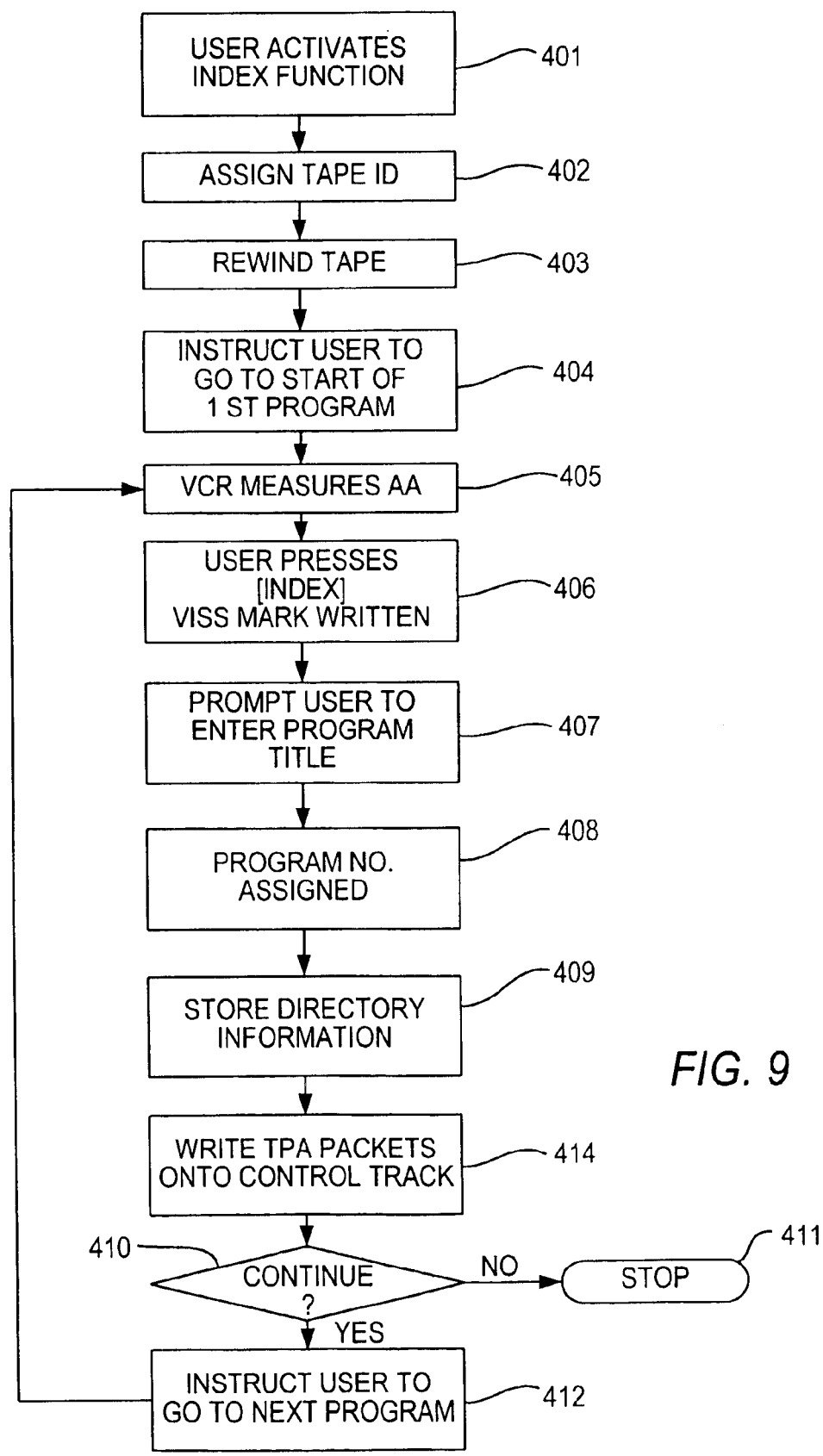
FIG. 9 is a flowchart showing the steps employed to index, a previously recorded tape in an indexing VCR that uses TPA packets according to the present invention.

FIG. 9 is a flowchart showing the steps employed to index a previously recorded tape in the indexing VCR 10 using TPA packets and VISS marks and is another method of generating a directory for a tape. In this method a directory for the tape is created and stored in the RAM 33. Tape identification, program number and absolute address (TPA) packets and VISS marks are recorded on the control track 246 of the tape, as shown in FIG. 10.

The user inserts the un-indexed recorded tape, which for example could be a tape recorded on a camcorder, into the VCR 10 and actuates the re-indexing by entering a command via keypad 32a or by selecting the indexing operation from a set of choices displayed on directory display 32e (step 401). The microprocessor controller 31 assigns a tape identification number (TID) (step 402). (The microprocessor controller 31 also displays the tape number to the user so that when the user ejects the tape he may write the tape number onto the cassette housing.) The microprocessor controller 31 commands the VCR to rewind the tape to the beginning of the tape (step 403). The microprocessor controller 31 displays an instruction for the user to advance the tape to the start of the first program (step 404). During such tape movement, the microprocessor controller 31 measures the absolute address using, for example, the method described in pending patent application serial No. 08/167,285, filed Dec. 15, 1993, our reference No. 25845/LWT, which is incorporated herein by this reference, as though set forth in full (step 405). In response to an INDEX command from the user, the microprocessor controller 31 writes a VISS mark in the control track 246 (step 406). The microprocessor controller 31 then displays on the display 32e a prompt to the user to enter the title of the first program or show on the tape (step 407). The microprocessor controller 31 assigns a program number to the program (step 408). The microprocessor 31 then stores the directory information in the RAM 33 at a location in the volume corresponding to the TID (tape identification number) (step 409). Then in step 414 TPA packets are written into the control track as shown in FIG. 10. FIG. 11 shows the format of a TPA packet according to the present invention. TPA packets continue to be written while the tape is advanced and the absolute address is measured for each TPA packet written. Then the user indicates that the last program on the tape has been reached by pressing a button that is not used for entering a title, for example the search button 32b and the indexing VCR exits the reindexing routine (step 411). Otherwise, the microprocessor controller 31 then prompts the user on the display 32e to fast forward (FF) the tape to the beginning of the next program (step 412). Note that throughout this description the indexing could be performed by remote control and the display of instructions can be performed by TV 50.

Figure 10:
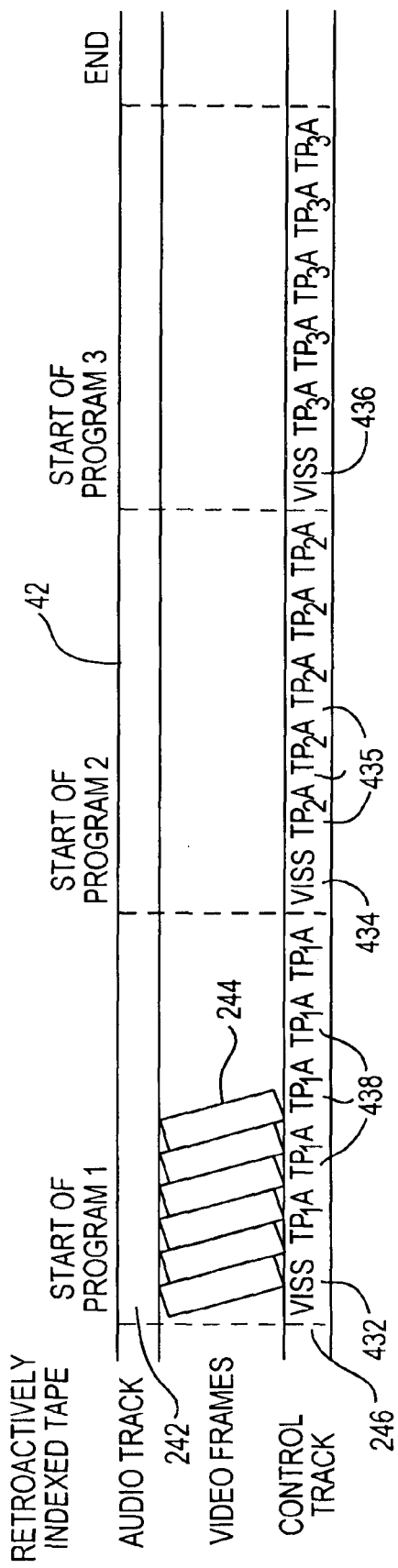
FIG. 10 is a schematic view of an embodiment for storing TPA packet and VISS marks in the control track of a tape to assist in the accessing of programs on the tape according to the present invention.
Figure 11:
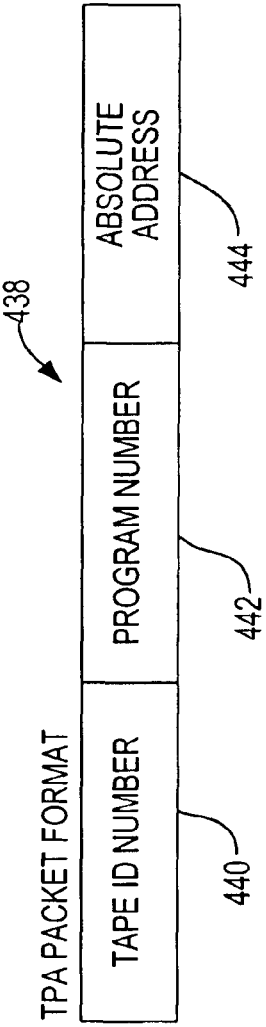
FIG. 11 shows the format of a TPA packet according to the present invention.

The tape has now been indexed with VISS marks at the beginning of each program and TPA packets, as shown in FIG. 10. The associated directory information is stored in the RAM 33 of the VCR 10. The operation of the VCR 10 when an indexed tape is inserted therein is described in continuation-in-part of application Serial No. 08/176,852, which also describes other methods of indexing.

Now the methods for recording and retrieving voice titles for a program recorded on a camcorder or a VCR are described with reference to FIGS. 12 through 14.

Figure 12:
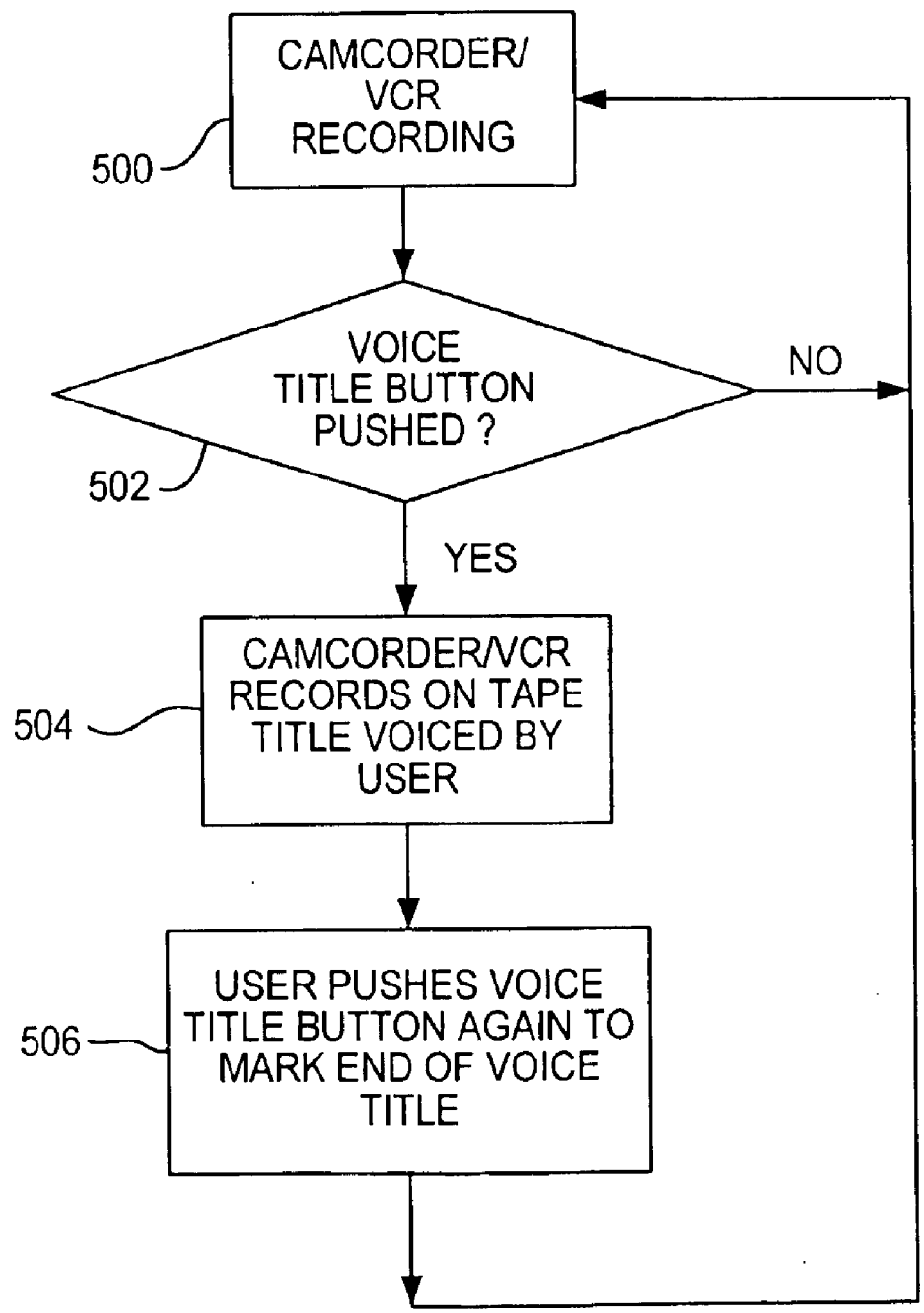
FIG. 12 is a flowchart showing the steps employed to add voice title to a program being recorded on a camcorder or a VCR according to the present invention.

In step 500 of FIG. 12 it is assumed that the camcorder or VCR are in the record mode. In step 502 it is determined whether a voice title button is pushed. If a voice title button has been pushed then the camcorder/VCR records a voice title voiced by a user on the tape in step 504. In step 506 the user pushes a voice title button again to mark the end of the voice title. The result is a recorded voice title as shown in FIG. 3.

Figure 13:
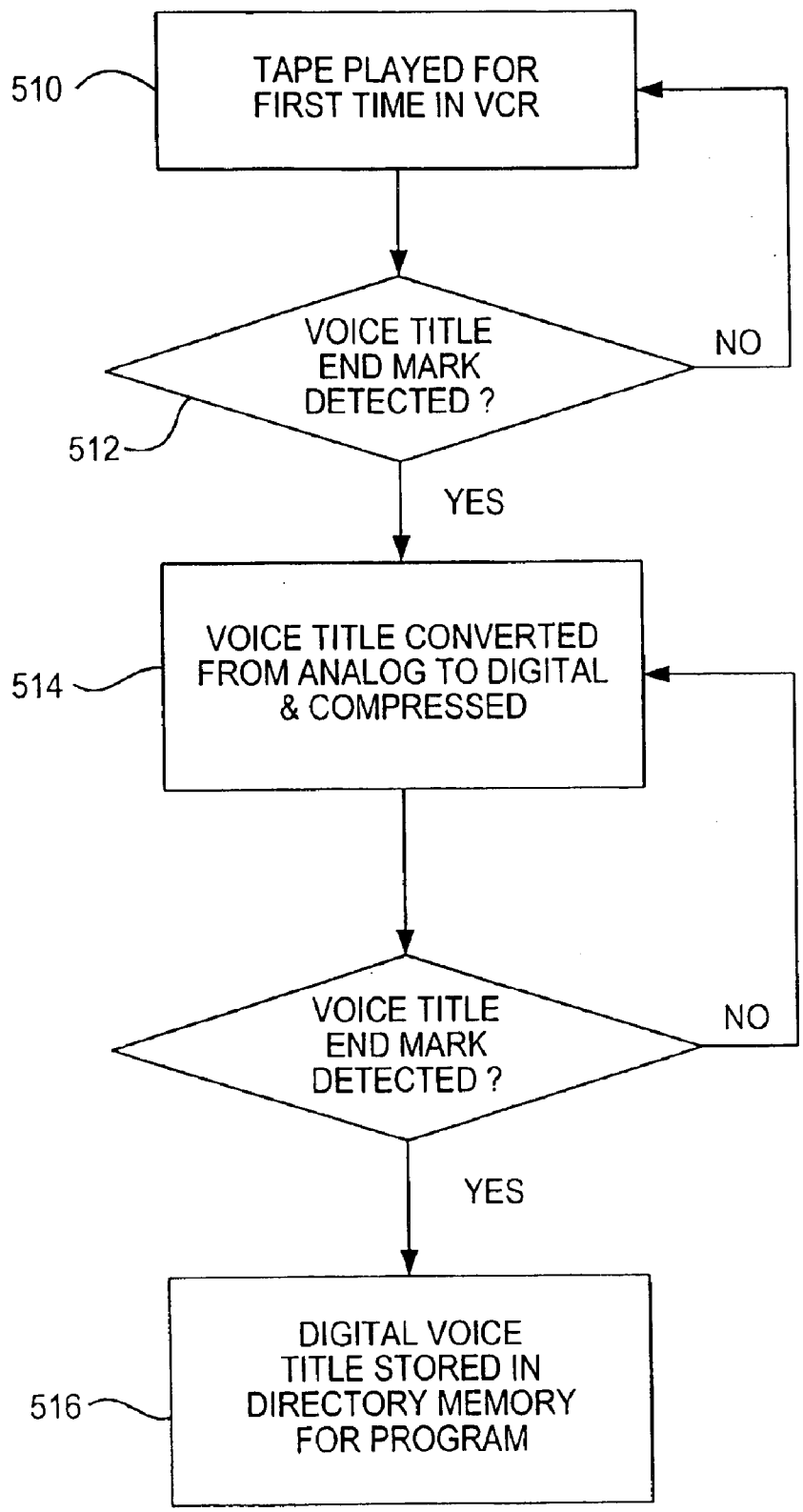
FIG. 13 is a flowchart showing the steps employed to detect a voice title and digitize the voice title for storing it into a directory according to the present invention.

FIG. 13 is a flow chart showing the steps employed to detect a voice title and digitize the voice title for storing it into a directory. In step 510 it is determined whether the tape is being played for the first time in the VCR. Then in step 512 it is determined whether a voice title mark is detected in the control track of the tape. If a voice title mark is detected, then in step 514 the voice title is converted from analog to digital and possibly compressed. When the voice title end mark is detected in step 515, the entire voice title is stored with the program directory information in the directory memory. The program number associated with the voice title can be determined by reading the TPA packet adjacent to the voice title on the tape.

Figure 14:
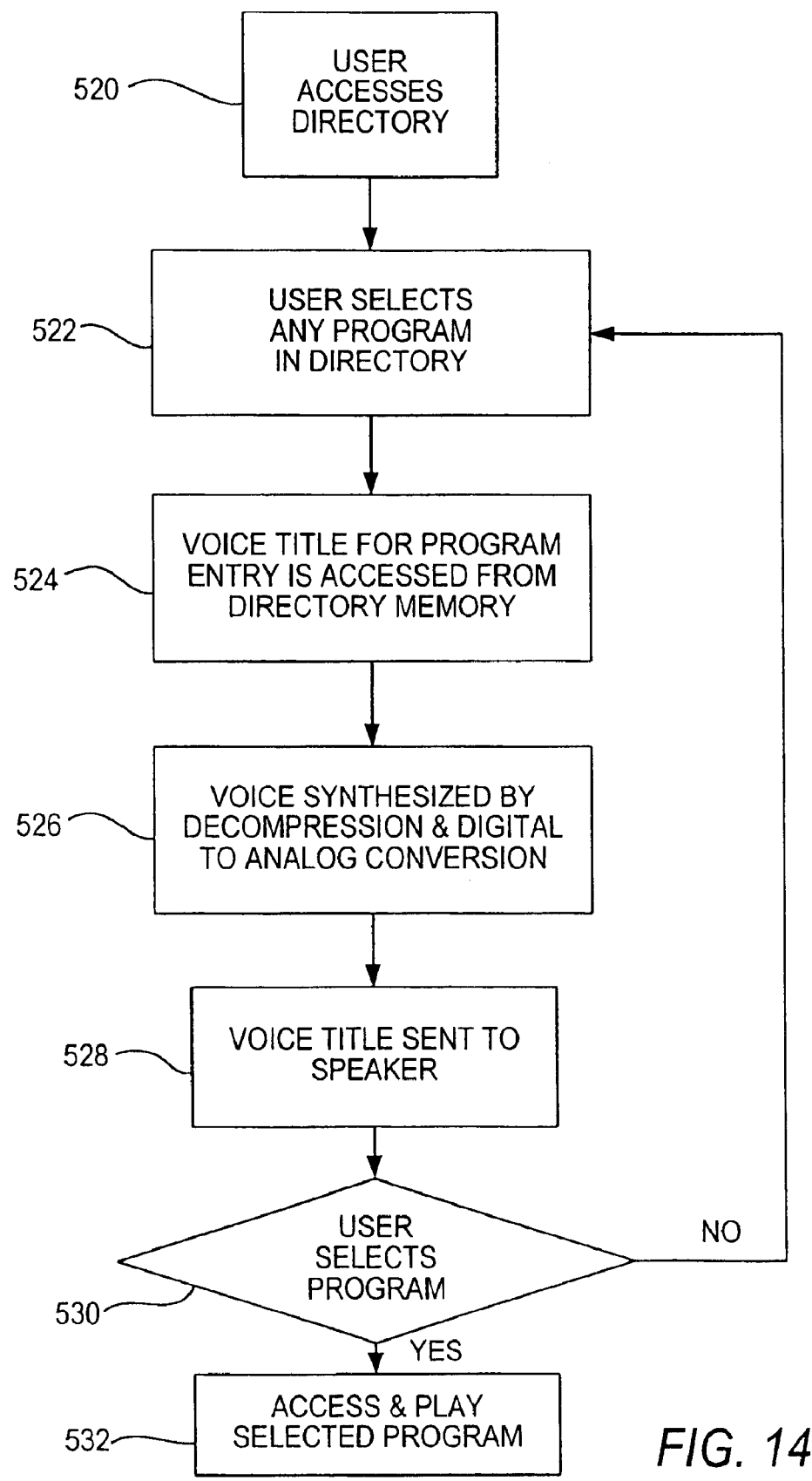
FIG. 14 is a flowchart showing the steps employed to use voice titles for access of a program to play according to the present invention.

FIG. 14 is a flow chart showing the steps employed to use voice titles for accessing programs to play. In step 520 the user accesses the directory memory. Then in step 522 the user selects any program in the directory by means of an onscreen cursor and in step 524 a voice title for the program entry is accessed from the directory memory responsive to a voice title play command generated by pressing an assigned button on remote 75. Then in step 526 a voice is synthesized from the accessed voice title by decompression and digital to analog conversion. Then in step 528 the synthesized voice is sent to a speaker and then in step 530 the user can either select the program corresponding to the voice title or can proceed to listen to the next voice title in the directory. If the user selects to play the program, then in step 532 the program address in the directory is used the access the program on the tape and then the VCR is put into a play mode.

Figure 15:
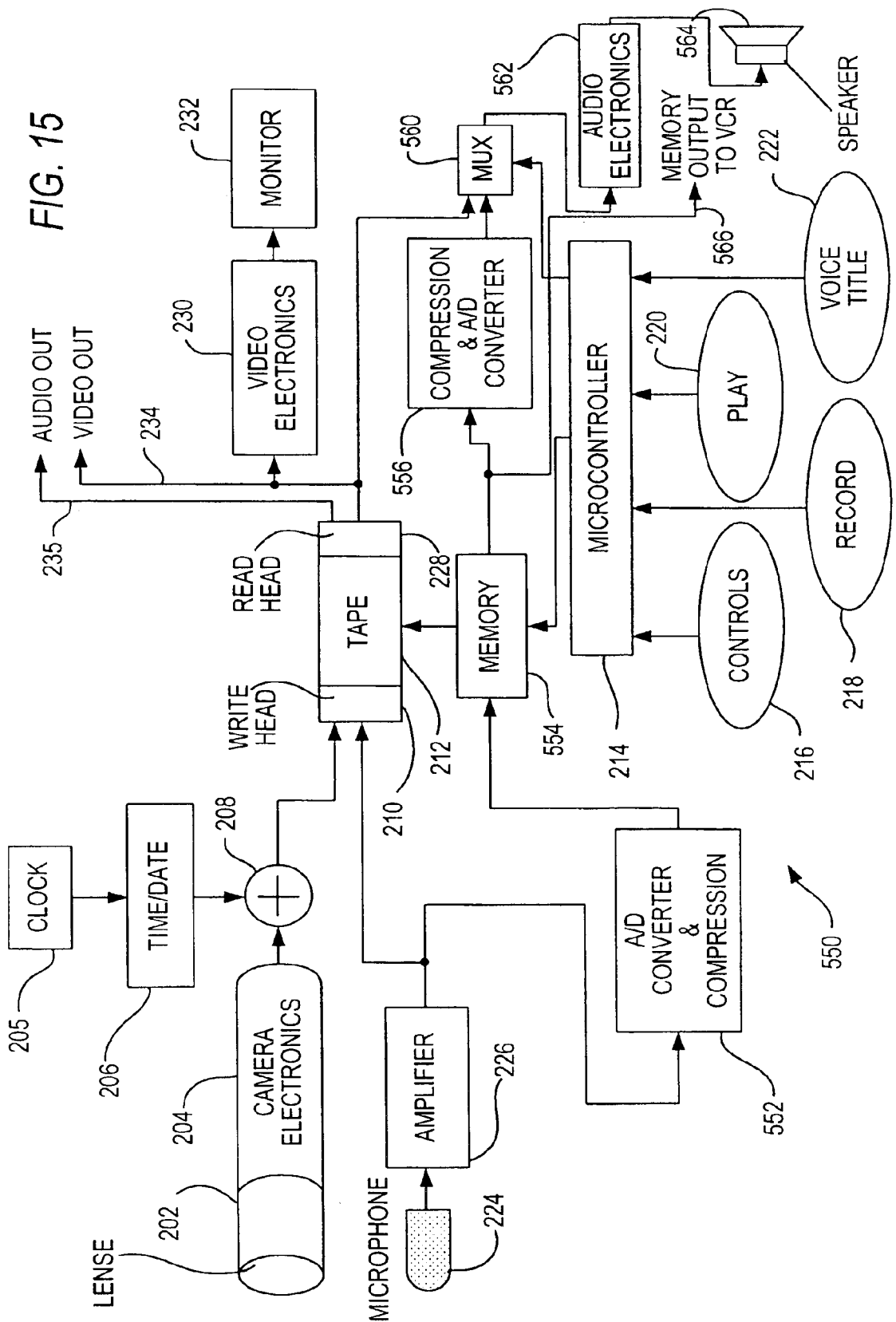
FIG. 15 is a block diagram of a camcorder including the capability for voice titles and including a memory for storing digitized voice titles according to the present invention.

FIG. 15 is a block diagram of an alternate configuration of a camcorder that includes a memory for storing digitized voice titles. FIG. 15 is very similar to FIG. 2, except that a digital memory 554 has been added to the camcorder. An analog to digital converter and digital compressor 552 is coupled to amplifier 226 for digitizing audio input and is coupled to memory 554 in order to store the digitized audio into the memory. The memory can also be used to store a directory in the same manner as RAM 33 of FIG. 4. Upon command a voice title can be read from memory 554 and decompressed and sent to digital analog converter 556 and output via audio electronics 562 to speaker 564. Note that the audio amplifier 226 is coupled to the write head to write the audio onto tape 212 and that the read head 228 is coupled to speaker 564. In operation the user would press voice title button 222 to record a title, and then speak into microphone 224. The spoken title would be digitized and stored in memory 554. The voice titles in memory 554 can be accessed in the manner indicated in FIG. 14 by using controls 216.

Figure 16:
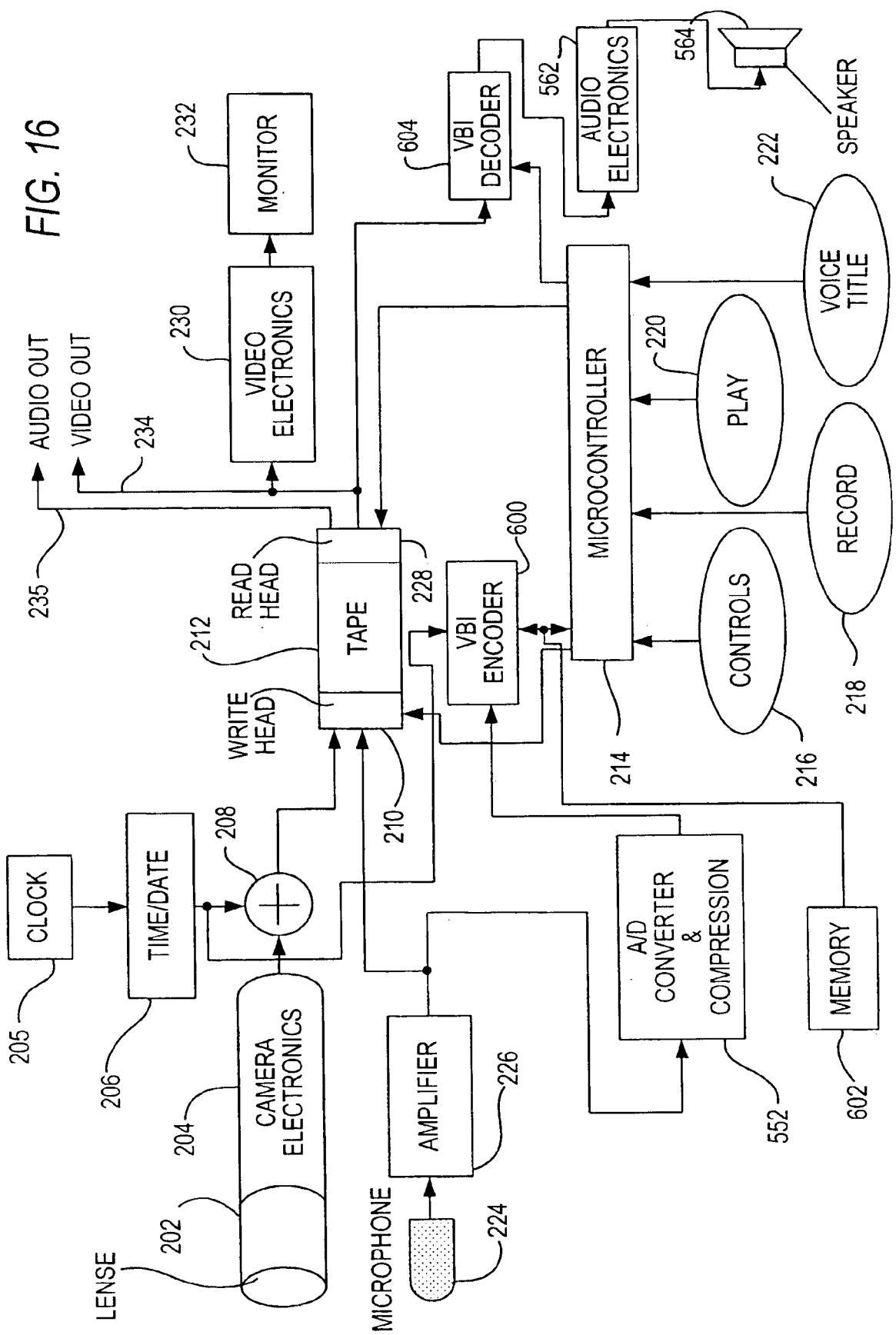
FIG. 16 is a block diagram of a camcorder having the capability of recording voice titles in the vertical blanking interval of video segments recorded onto a sequential tape according to the present invention.

FIG. 16 is a schematic of a camcorder similar to the if camcorder shown in FIG. 15, except that the camcorder of FIG. 16 has a vertical blanking interval encoder 600. The vertical blanking interval line encoder 600 receives an input from analog to digital (A/D) converter 552 and also an input from the time/date 206 that is read from clock 205. The VBI encoder 600 has an interface to microcontroller 214. In one embodiment a memory 602 is accessible via the VBI encoder 600 and the microcontroller 214. To record a voice title onto tape 212, the user presses voice title button 222 and speaks into microphone 224. The voice title is digitized by A/D converter 552 and possibly compressed and then the digitized voice title is encoded by vertical blanking interval encoder 600 and written into the vertical blanking interval lines in the video segment being recorded on tape 212. In FIG. 16 the path for writing VBI encoded information onto the tape is shown to be via microcontroller 214 which has an interface to write head 210. The VBI encoder 600 can also be used to record a time/date stamp read from time/date 206 into the vertical blanking interval lines of a video segment being recorded on the tape 212.

If a voice title is recorded onto tape 212 then the microcontroller 214 can also record a voice present indicator into the vertical blanking interval lines of the video segment being recorded on the tape. The microcontroller sends the voice title present indicator to the VBI encoder 600 which encodes the voice title present indicator for writing it into the vertical blanking interval lines of the video segment.

A voice title recorded in the vertical blanking interval lines of a video segment can be reviewed by a user by sending controls to microcontroller 214 which can access the proper position of the tape 212 and via the read head 228, a vertical blanking interval decoder 604 can extract the voice title from the video segment and the voice title can be "spoken" by speaker 564.

Figures 17, 18:
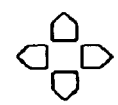
FIG. 17 is a screen display of a segment directory according to the present invention.
FIG. 18 is an alternative screen display of a directory that combines voice titles and textual titles.

FIG. 17 shows a display of a segment directory on a display which could be a television or a display on the camcorder or VCR. As shown, a segment directory contains the date and time of each segment, the length of each segment and whether or not a voice title is available for the segment. The user selects a segment for playing by moving a cursor 692 to the desired segment. In FIG. 17 the cursor 692 is at a segment which was recorded on Jan. 31, 1994 at the time 15:50:10. The length of the segment is 45 minutes and a voice title is available as indicated by the Y (699).

FIG. 18 shows an alternative, hybrid format in a screen display 640. In this format a reference to the voice titles such as shown at 642 and a reference to the textual titles such as shown at 644 are combined in the same directory. If desired the information in FIG. 17 could also be incorporated in the format of FIG. 18. The reference to each voice title on the screen is linked to the memory address of the corresponding compressed digitized voice title data stored in RAM 33 by the described pointers. Thus, when the user selects a voice title reference on the screen with a cursor 646, the title is audibly reproduced by the speaker as a substitute for the text titles displayed on the screen. Thus, in either case, the user can decide whether to retrieve and play a stored video program based on its title.

Figure 19:
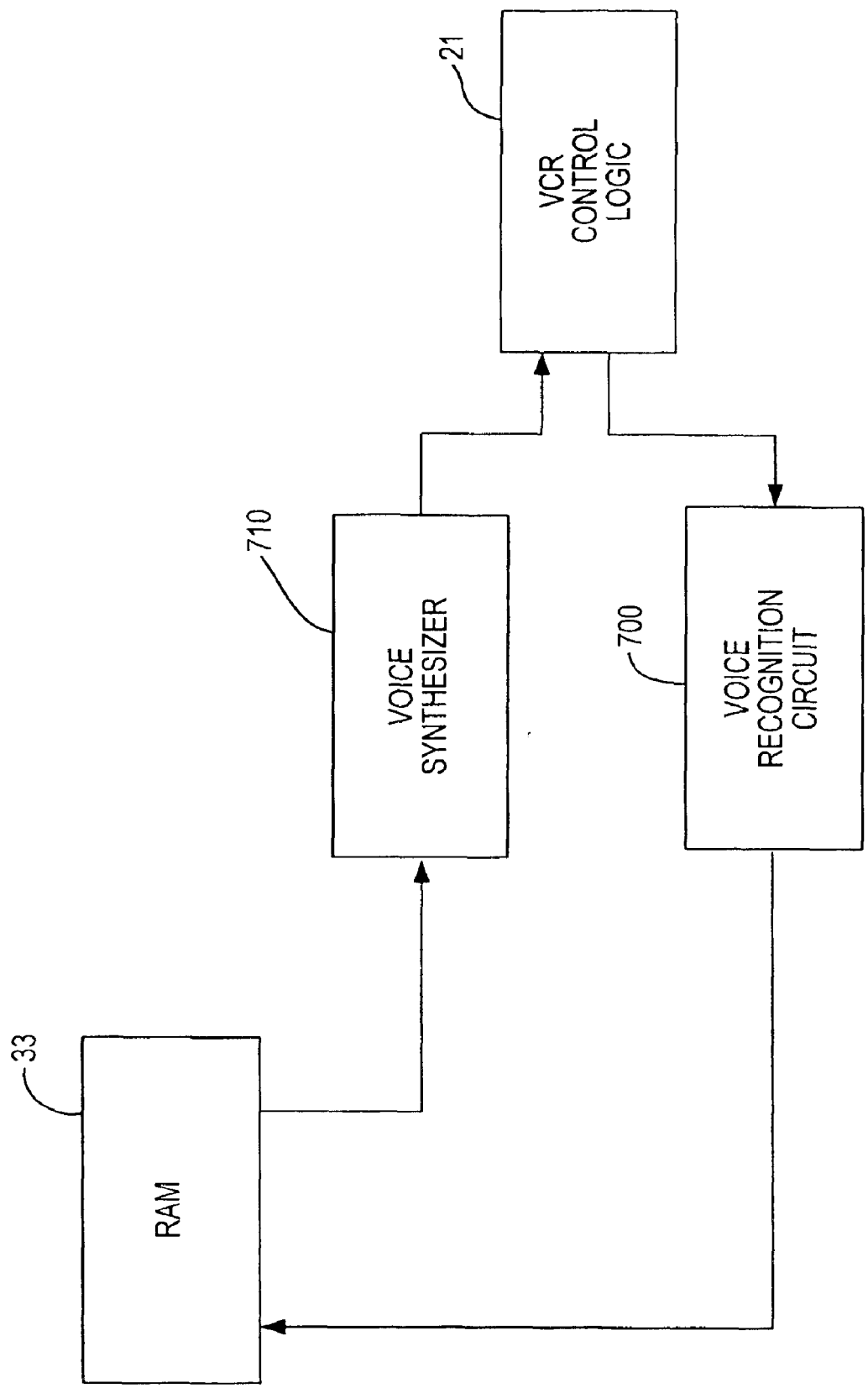
FIG. 19 is an alternative embodiment of the indexing video cassette recorder of FIG. 4.

FIG. 19 illustrates an alternative embodiment of the indexing video cassette recorder of FIG. 4. The voice titles generated by microphone 264 are coupled through VCR control logic 21 to a voice recognition circuit 700, which converts the audio signals to textual form. The converted voice titles in the form of coded alphanumeric binary signals are stored in RAM 33 as part of the video tape directories. Thus, they are indistinguishable when displayed by television monitor 50 from the other titles of directories stored in RAM 33. If desired, the converted voice titles, or any other titles in the directories for that matter, could be converted back to voice titles by a voice synthesizer 710 prior to display of the directory on television monitor 50 and reproduced audibly, either instead of or in addition to the textual titles. Preferably, voice recognition circuit 700 and voice synthesizer 710 are implemented in software executed by microprocessor controller 31 (FIG. 4).

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention. It is therefore intended by the appended claims to cover any and all such applications, modifications and embodiments within the scope of the present invention.

What is claimed is:

1. A method for providing voice titles for video programs recorded on a recording medium comprising:
   recording video programs on the recording medium;
   generating audio signals of titles for the recorded programs;
   converting the audio signals to textual title signals and storing the textual title signals;
   displaying on a screen a directory of the video programs recorded on the recording medium, wherein the directory includes textual titles associated with the displayed video programs and wherein the textual titles are generated from the textual title signals;
   selecting one of the video programs from the directory; and
   converting a stored textual title signal corresponding to the selected video program to an audio signal to apprise a user of the voice title of the selected video program.

2. The method of claim 1, wherein the audio signal is generated while the video program is being recorded.

3. The method of claim 2, wherein the audio signal is converted to a textual title signal while the video program is being recorded.

4. The method of claim 1, wherein storing the textual title signals includes transferring the textual title signals to a random access memory for later use to select programs for playback.

5. The method of claim 4, further comprising recording in the random access memory with the stored textual title signal other data to assist in the playback of the recorded program.

6. The method of claim 5, wherein the other data includes the recording medium location of the start of the recorded program.

7. The method of claim 5, wherein the other data includes the length of the recorded program.

8. The method of claim 5, wherein the other data includes voice title designations.

9. The method of claim 8, wherein the voice title designations include the day and time of recording.

10. The method of claim 8, wherein the voice title designations include the length of the program.

11. The method of claim 5, further comprising positioning the recording medium at the beginning of a video program responsive to the other data.

12. The method of claim 1, further comprising playing the selected video program.

13. The method of claim 1, wherein generating audio signals of titles includes speaking the titles into a microphone.

14. The method of claim 1, wherein generating audio signals of titles includes speaking the titles into a microphone contemporaneously with recording the video program.

15. The method of claim 1, wherein displaying displays voice title designations for the recorded video programs for which audio signals are converted.

16. The method of claim 1, wherein displaying includes displaying the textual titles for the recorded video programs.

17. The method of claim 1, wherein the stored textual title signals are alphanumeric textual signals.

18. The method of claim 17, further comprising storing the alphanumeric textual signals in the random access memory.

19. The method of claim 1, wherein storing the textual titles includes storing the textual titles in a memory location separate from a storage of the directory of the video programs recorded on the recording medium.

20. An apparatus for providing voice titles for video programs recorded on a recording medium comprising:
   means for recording video programs on the recording medium and for displaying on a screen a directory of the video programs recorded on the recording medium and for selecting one of the video programs from the directory, wherein the directory includes textual titles associated with the displayed video programs and wherein the textual titles are generated from the textual title signals; and
   audio processing means, coupled to the means for recording video programs, for generating audio signals of titles for the recorded programs, converting the audio signals to textual title signals, storing the textual title signals, and for converting a stored textual title signal, corresponding to a selected video program, to an audio signal to apprise a user of the voice title of the selected video program.

21. The apparatus of claim 20, wherein the audio processing means further comprises means for generating the audio signal while the video program is being recorded.

22. The apparatus of claim 21, wherein the audio processing means further comprises means for converting the audio signal to a textual title signal while the video program is being recorded.

23. The apparatus of claim 20, wherein the means for recording video programs includes a random access memory for storing textual title signals for later use to select programs for playback.

24. The apparatus of claim 23, wherein the random access memory includes means for storing with the stored textual title signal other data provided by the means for recording video programs to assist in the playback of the recorded program.

25. The apparatus of claim 24, wherein the other data includes the recording medium location of the start of the recorded program.

26. The apparatus of claim 24, wherein the other data includes the length of the recorded program.

27. The apparatus of claim 24, wherein the other data includes voice title designations.

28. The apparatus of claim 27, wherein the voice title designations include the day and time of recording.

29. The apparatus of claim 27 wherein the voice title designations include the length of the program.

30. The apparatus of claim 24, wherein the means for recording video programs further comprises means for positioning the recording medium at the beginning of a video program responsive to the other data.

31. The apparatus of claim 20, wherein the means for recording video programs further comprises means for playing the selected video program.

32. The apparatus of claim 20, wherein the audio processing means further comprises a microphone for generating audio signals of titles by speaking the titles into the microphone.

33. The apparatus of claim 20, wherein the audio processing means further comprises a microphone for generating audio signals of titles by speaking the titles into a microphone contemporaneously with recording the video program.

34. The apparatus of claim 20, wherein the means for recording video programs further comprises means for displaying voice title designations for the recorded video programs for which audio signals are converted.

35. The method of claim 20, wherein the means for recording video programs further comprises means for displaying the textual titles for the recorded video programs.

36. The apparatus of claim 20, wherein the stored textual title signals are alphanumeric textual signals.

37. The apparatus of claim 36, wherein the alphanumeric textual signals are stored in the random access memory.

38. The apparatus of claim 20, further comprising the textual titles being stored in a memory location separate from a storage of the directory of the video programs recorded on the recording medium.

39. An apparatus for providing voice title information for video programs recorded on a recording medium, comprising:
   a random access memory;
   a video program recording control logic controller;
   a microprocessor random access memory controller coupled between the random access memory and the video program recording control logic controller; and
   an audio input device coupled to the video program recording control logic controller and responsive to audio signals;
   the random access memory being coupled to the video program recording logic controller through a voice recognition circuit, such that audio signals are converted to textual title signals by the voice recognition circuit under the control of the video program logic controller and stored in the random access memory under the control of the microprocessor random access memory controller as stored textual title signals for displaying textual titles of video programs recorded on the recording medium.

40. The apparatus of claim 39, further comprising:
   an audio output device coupled to the video program recording control logic controller; and
   a voice synthesizer coupled between the random access memory and the video program recording control logic controller, such that the stored textual signals are converted under the control of the random access memory controller to audio signals corresponding to video programs recorded on the recording medium by the voice synthesizer and are output by the audio output device under the control of the video program recording control logic controller.

41. A method for providing voice titles for video programs recorded on a recording medium comprising:
   recording video programs on the recording medium;
   generating audio signals of titles for the recorded programs;
   converting the audio signals to textual title signals and storing the textual title signals; and
   displaying on a screen a directory of the video programs recorded on the recording medium, the directory including textual titles derived from the stored textual title signals.

42. The method of claim 41, wherein the audio signal is generated while the video program is being recorded.

43. The method of claim 41, wherein the audio signal is converted to a textual title signal while the video program is being recorded.

44. The method of claim 41, wherein storing the textual title signals includes transferring the textual title signals to a random access memory for later use to select programs for playback.

45. The method of claim 44, further comprising recording in the random access memory with the stored textual title signal other data to assist in the playback of the recorded program.

46. The method of claim 45, further comprising positioning the recording medium at the beginning of a video program responsive to the other data.

47. The method of claim 41, further comprising playing the selected video program.

48. The method of claim 41, wherein generating audio signals of titles includes speaking the titles into a microphone.

49. The method of claim 41, wherein generating audio signals of titles includes speaking the titles into a microphone contemporaneously with recording the video program.

50. The method of claim 41, wherein the stored textual title signals are alphanumeric textual signals.

51. The method of claim 50, further comprising storing the alphanumeric textual signals in the random access memory.

52. The method of claim 41, wherein storing the textual titles includes storing the textual titles in a memory location separate from a storage of the directory of the video programs recorded on the recording medium.

53. An apparatus for providing voice titles for video programs recorded on a recording medium comprising:
    means for recording video programs on the recording medium and for displaying on a screen a directory of the video programs recorded on the recording medium, the directory including textual titles derived from stored textual title signals; and
    audio processing means, coupled to the means for recording video programs, for generating audio signals of titles for the recorded programs, converting the audio signals to textual title signals, and storing the textual title signals.

54. The apparatus of claim 53, wherein the audio processing means further comprises means for generating the audio signal while the video program is being recorded.

55. The apparatus of claim 53, wherein the means for recording video programs includes a random access memory for storing textual title signals for later use to select programs for playback.

56. The apparatus of claim 55, wherein the random access memory includes means for storing with the stored textual title signal other data provided by the means for recording video programs to assist in the playback of the recorded program.

57. The apparatus of claim 56, wherein the means for recording video programs further comprises means for positioning the recording medium at the beginning of a video program responsive to the other data.

58. The apparatus of claim 53, wherein the means for recording video programs further comprises means for playing the selected video program.

59. The apparatus of claim 53, wherein the audio processing means further comprises a microphone for generating audio signals of titles by speaking the titles into the microphone.

60. The apparatus of claim 53, wherein the audio processing means further comprises a microphone for generating audio signals of titles by speaking the titles into a microphone contemporaneously with recording the video program.

61. The apparatus of claim 53, wherein the stored textual title signals are alphanumeric textual signals.

62. The apparatus of claim 61, wherein the alphanumeric textual signals are stored in the random access memory.

63. The apparatus of claim 53, further comprising the textual titles being stored in a memory location separate from a storage of the directory of the video programs recorded on the recording medium.

* * * * *